(12) United States Patent
Miller et al.

(10) Patent No.: US 8,955,897 B1
(45) Date of Patent: Feb. 17, 2015

(54) MOBILE REPAIR AND RESPONSE UNIT

(71) Applicants: Timothy Miller, Troutman, NC (US); Kimberly Miller, Troutman, NC (US)

(72) Inventors: Timothy Miller, Troutman, NC (US); Kimberly Miller, Troutman, NC (US)

( * ) Notice: Subject to any disclaimer, the term of this patent is extended or adjusted under 35 U.S.C. 154(b) by 0 days.

(21) Appl. No.: 13/946,008

(22) Filed: Jul. 19, 2013

(51) Int. Cl.
*B60P 3/025* (2006.01)
*B60P 3/14* (2006.01)
*B62D 33/04* (2006.01)

(52) U.S. Cl.
CPC ........................................ *B62D 33/04* (2013.01)
USPC ......................................................... 296/24.32

(58) Field of Classification Search
CPC .................................. B60P 3/025; B60P 3/14
USPC ......................................................... 296/24.32
See application file for complete search history.

(56) References Cited

U.S. PATENT DOCUMENTS

| | | | | |
|---|---|---|---|---|
| 2,358,446 A * | 9/1944 | Couse | ........................ | 296/24.32 |
| 2,365,940 A * | 12/1944 | Couse | ........................ | 296/24.32 |
| D166,530 S * | 4/1952 | Couse | ........................... | D12/99 |
| 3,254,756 A | 6/1966 | Rankin | | |
| 3,308,845 A * | 3/1967 | Bellas et al. | ................ | 137/234.6 |
| 3,697,123 A * | 10/1972 | Gygrynuk | ................... | 296/24.32 |
| 4,186,850 A * | 2/1980 | Mahar | ............................. | 222/28 |
| 4,230,358 A * | 10/1980 | Legueu | ........................ | 296/24.32 |
| 4,362,329 A * | 12/1982 | Laube et al. | ................ | 296/26.11 |
| 4,688,308 A * | 8/1987 | Alvarez | ........................ | 29/33 R |
| 5,515,974 A | 5/1996 | Higson | | |
| D376,475 S | 12/1996 | Simons | | |
| 5,833,294 A * | 11/1998 | Williams et al. | ........... | 296/24.32 |
| 8,523,256 B2 * | 9/2013 | McCoubrey | ............... | 296/24.32 |
| 2007/0182182 A1 * | 8/2007 | Hall | ............................ | 296/24.32 |
| 2008/0022462 A1 | 1/2008 | Benson | | |
| 2009/0038081 A1 | 2/2009 | Berton et al. | | |
| 2009/0200822 A1 * | 8/2009 | Williams | .................... | 296/24.35 |
| 2011/0113563 A1 | 5/2011 | Gabb | | |

FOREIGN PATENT DOCUMENTS

| CN | 202152024 | * | 2/2012 |
|---|---|---|---|
| CN | 202225783 | * | 5/2012 |

\* cited by examiner

*Primary Examiner* — Dennis H Pedder

(57) ABSTRACT

The mobile repair and response unit is a truck with an attached trailer that includes a plurality of uniquely defined compartments and areas that are each provided to accomplish a particular task. The attached trailer contains a cabin within which a customer may stay while the customer's vehicle is being repaired. The attached trailer includes a tire balancing station adjacent to a tire changing station. An opposing side of the attached trailer includes a plurality of pump stations that dispense different types of fuels or lubricating oils that are customarily used to operate different types of vehicles. An air station is included on the attached trailer in order to provide pressurized air for use with pneumatically operated tools or to inflate tires of the vehicle being repaired. The rear of the attached trailer includes a ramp that folds down to enable entrance into the attached trailer.

7 Claims, 3 Drawing Sheets

MOBILE REPAIR AND RESPONSE UNIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of repair and response vehicles, more specifically, a vehicle specifically designed to provide a particular level of repair to another vehicle, and which is itself entirely mobile.

B. Discussion of the Prior Art

As will be discussed immediately below, no prior art discloses a mobile repair and response unit that involves a retrofitted truck with the attached trailer containing a cabin within which a customer may stay while the customer's vehicle is being repaired; wherein the attached trailer includes a tire balancing station adjacent to a tire changing station; wherein an opposing side of the attached trailer includes a plurality of pump stations that dispense different types of fuels or lubricating oils that are customarily used to operate different attached trailer in order to provide pressurized air in order to drive pneumatically operated tools or to inflate tires of the vehicle being repaired; wherein the rear of the attached trailer includes a ramp that folds down to enable entrance into the attached trailer; wherein the interior of the attached trailer includes a bathroom, seating, television, and vending machine for the customer; wherein the attached trailer also includes a spare tire rack; wherein the spare tire rack, the tire changing station, the tire balancing station, and the pump stations are recessed within the attached trailer and individually include an overhead roll up styled door to close up the respective compartment of the attached trailer.

The Berton et al. Patent Application Publication (U.S. Pub. No. 2009/0038081) discloses a tool kit to be stored in a vehicle to enable an operator in emergency situations to effect minor repairs, for example, to change a flat tire. However, the tool kit is not a specially designed truck that includes different stations for repairing different needs for a vehicle.

The Gabb Patent Application Publication (U.S. Pub. No. 2011/0113563) discloses a power-assisted tire changing kit that is comprised of a 12-volt electric impact wrench, three impact wrench adapters, and a set of lug nuts sockets that match the electric impact wrench with various size lug nuts. However, the tire changing kit is not a specially designed truck capable of mobilizing itself to a broken down vehicle in order to provide repair of said vehicle on site.

The Benson Patent Application Publication (U.S. Pub. No. 2008/0022462) discloses a battery powered vehicle jack and wrench kit. However, the vehicle jack and wrench kit is not a part of a mobile repair truck that has uniquely defined compartments and capabilities assigned to an attached trailer.

The Rankin Patent (U.S. Pat. No. 3,254,756) discloses a safety kit for an automobile having a fire extinguisher. Again, the kit is itself portable, and not a fixture of a specially designed truck with multiple vehicular repairing capabilities.

The Higson Patent (U.S. Pat. No. 5,515,974) discloses an emergency and security kit that includes an array of articles, such as a flashlight, first aid kit, fire extinguisher, etc., that are housed and organized within a case. However, the emergency and security kit is not a part of a specially designed truck that includes specific compartments that are each designated for use with a particular vehicular repair capability.

The Simons Patent (U.S. Pat. No. Des. 376,475) illustrates an ornamental design for an emergency kit for vehicles, which does not depict a trailer with particular compartments that are each designated for particular vehicular repair capabilities.

While the above-described devices fulfill their respective and particular objects and requirements, they do not describe a mobile repair and response unit that involves a retrofitted truck with the attached trailer containing a cabin within which a customer may stay while the customer's vehicle is being repaired; wherein the attached trailer includes a tire balancing station adjacent to a tire changing station; wherein an opposing side of the attached trailer includes a plurality of pump stations that dispense different types of fuels or lubricating oils that are customarily used to operate different types of vehicles; wherein an air station is included on the attached trailer in order to provide pressurized air in order to drive pneumatically operated tools or to inflate tires of the vehicle being repaired; wherein the rear of the attached trailer includes a ramp that folds down to enable entrance into the attached trailer; wherein the interior of the attached trailer includes a bathroom, seating, television, and vending machine for the customer; wherein the attached trailer also includes a spare tire rack; wherein the spare tire rack, the tire changing station, the tire balancing station, and the pump stations are recessed within the attached trailer and individually include an overhead roll up styled door to close up the respective compartment of the attached trailer. In this regard, the mobile repair and response unit departs from the conventional concepts and designs of the prior art.

SUMMARY OF THE INVENTION

The mobile repair and response unit is a truck with an attached trailer that includes a plurality of uniquely defined compartments and areas that are each provided to accomplish a particular task. The attached trailer contains a cabin within which a customer may stay while the customer's vehicle is being repaired. The attached trailer includes a tire balancing station adjacent to a tire changing station. An opposing side of the attached trailer includes a plurality of pump stations that dispense different types of fuels or lubricating oils that are customarily used to operate different types of vehicles. An air station is included on the attached trailer in order to provide pressurized air for use with pneumatically operated tools or to inflate tires of the vehicle being repaired. The rear of the attached trailer includes a ramp that folds down to enable entrance into the attached trailer. The interior of the attached trailer includes a bathroom, seating, television, and vending machine for the customer. The attached trailer also includes a spare tire rack. The spare tire rack, the tire changing station, the tire balancing station, and the pump stations are recessed within the attached trailer and individually include an overhead roll-up styled door to close up the respective compartment of the attached trailer.

It is an object of the invention to provide a mobile truck that is able to conduct a plurality of vehicular repairs on site where a broken down vehicle is located.

A further object of the invention is to provide a mobile response and repair truck that includes an attached trailer that is a part of the chassis, and which includes a plurality of individual compartments that are each designed to provide a particular function attributed with vehicular repair or other function associated therewith.

A further object of the invention is to provide a mobile response and repair truck that is able to change, balance, and inflate a tire of a vehicle.

An even further object of the invention is to provide a mobile response and repair truck that includes a tire rack for storing a plurality of different types and sizes of new tires that are to be used when needed.

A further object of the invention is to provide a mobile response and repair truck that includes a customer lounge inside of the trailer, which can provide a place for a customer to be seated, a vending machine, and possibly a television.

An even further object of the invention is to provide a toilet adjacent the customer lounge.

Another object of the invention is to provide a ramp on the back side of the mobile repair and response truck, which can fold down to enable ingress and egress with respect to the interior of the trailer portion of the truck.

Another object of the invention is to provide a plurality of pump stations that can dispense different types of fuels or lubricating oils that are associated with refueling or conducting an oil change for the vehicle.

These together with additional objects, features and advantages of the mobile repair and response unit will be readily apparent to those of ordinary skill in the art upon reading the following detailed description of presently preferred, but nonetheless illustrative, embodiments of the mobile repair and response unit when taken in conjunction with the accompanying drawings.

In this respect, before explaining the current embodiments of the mobile repair and response unit in detail, it is to be understood that the mobile repair and response unit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mobile repair and response unit.

It is therefore important that the claims be regarded as including such equivalent construction insofar as they do not depart from the spirit and scope of the mobile repair and response unit. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
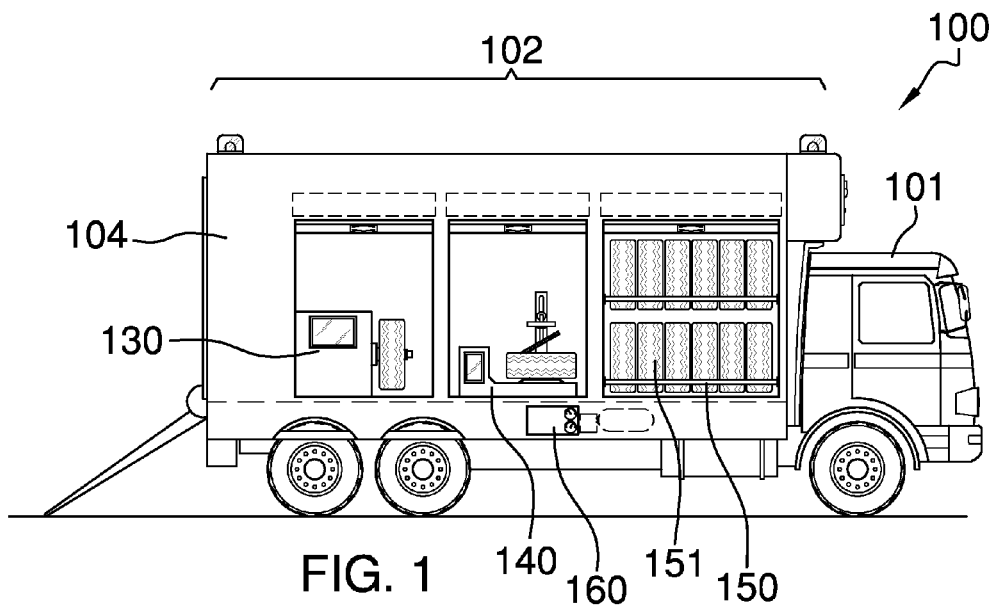
FIG. 1 illustrates a side view of the mobile repair and response unit.
Figure 2:
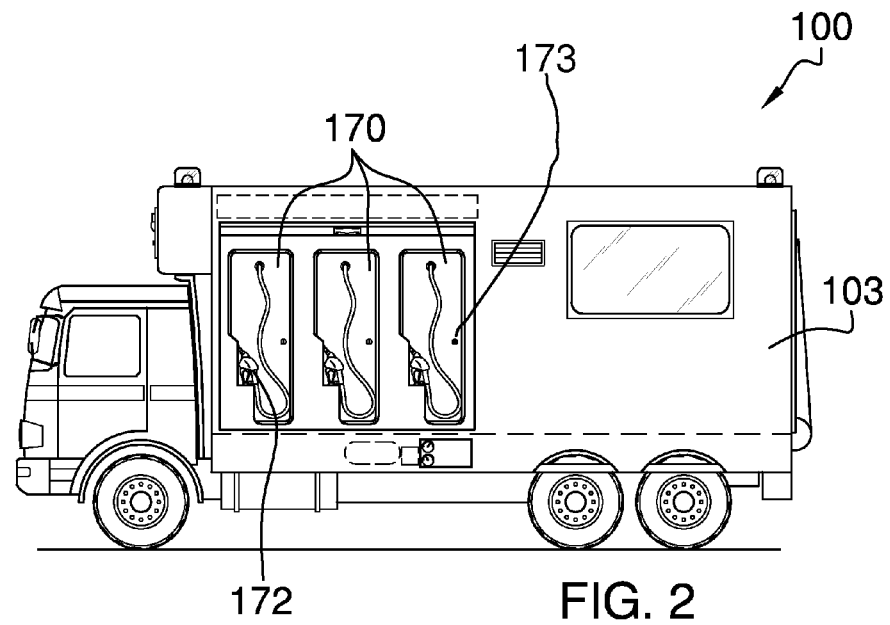
FIG. 2 illustrates an opposing side view of the mobile repair and response unit.
Figure 3:
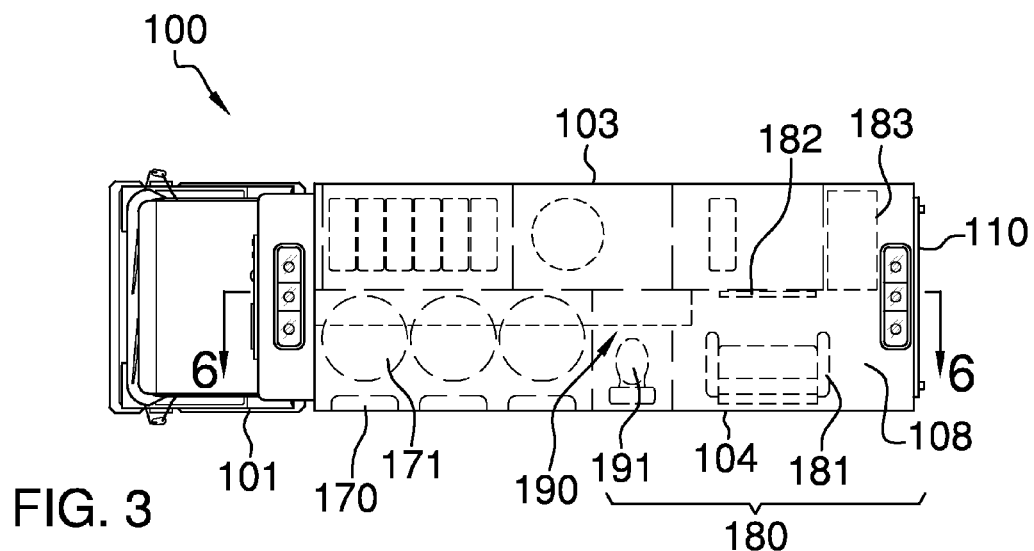
FIG. 3 illustrates a top view of the mobile repair and response unit.
Figure 4:
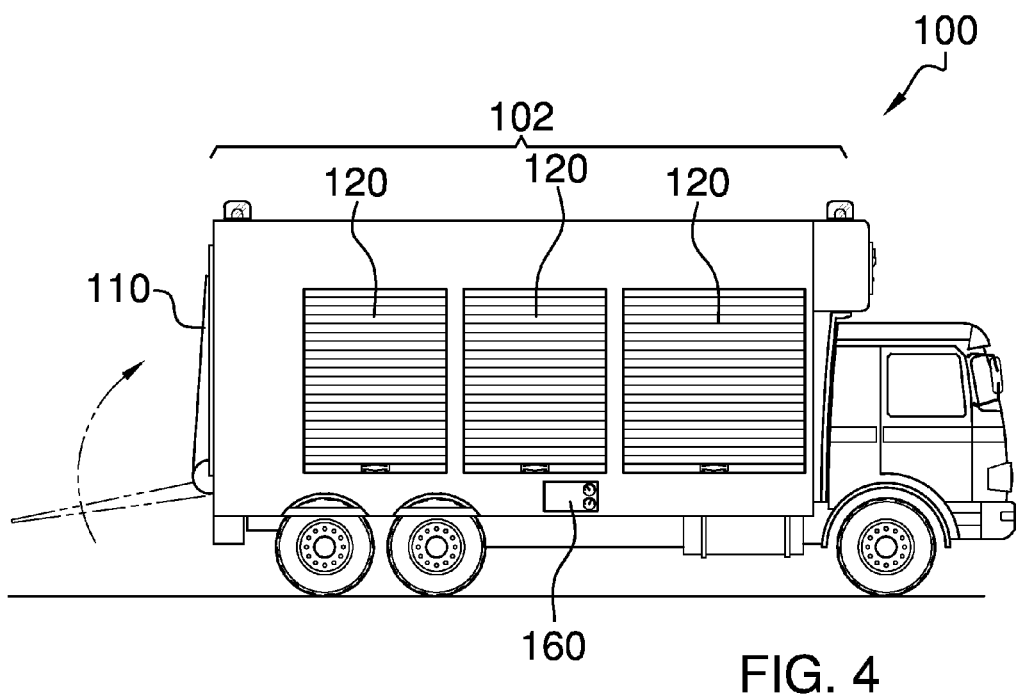
FIG. 4 illustrates a side view of the mobile repair and response unit, and depicting lowering of the ramp.
Figure 5:
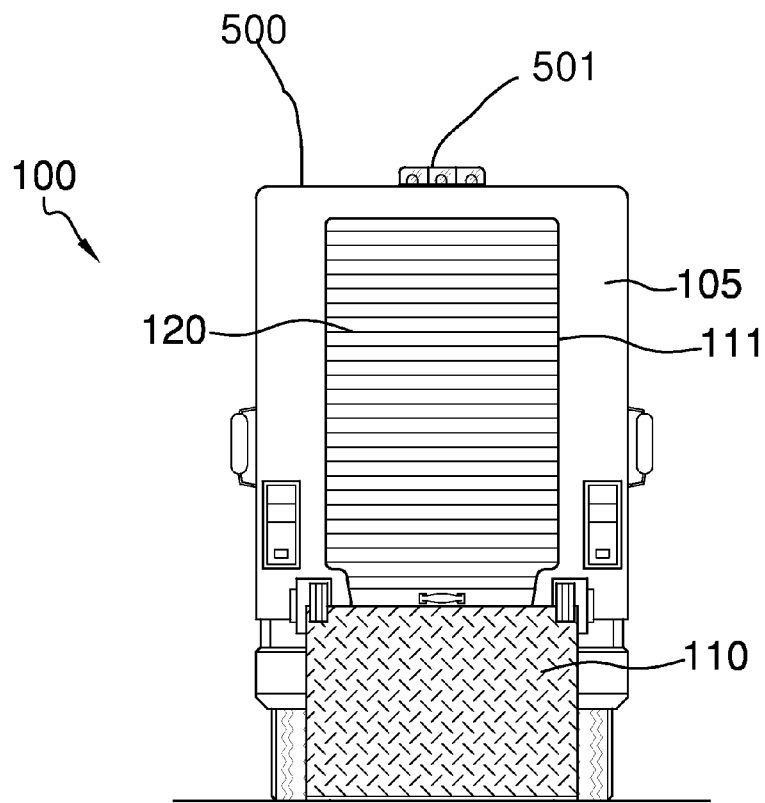
FIG. 5 illustrates a rear view of the mobile repair and response unit.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A mobile repair and response unit 100 (hereinafter invention) is further defined with a truck 101 with a trailer 102 that is modified to include a plurality of components that are attributed with vehicular repair and maintenance.

The trailer 102 is not of the tongue form, but is a part of the chassis of the truck 101. The trailer 102 is further defined with a left side 103 a right side 104, and a rear side 105. The trailer 102 is further defined with a ramp 110 that folds down to expose a rear entrance 111 provided at the rear side 105 of the trailer 102. The rear entrance 111 includes an overhead roll-up door 120 that opens and closes.

The right side 104 includes a tire balance station 130 that is adjacent a tire change station 140. The tire change station is also adjacent a tire rack 150 that supplies a plurality of different sized tires 151 thereon. The right side 104 includes the tire balance station 130, the tire change station 140, and the tire rack 150 in order to provide full tire repair and maintenance to a stranded vehicle as needed. The invention 100, and more specifically, the trailer 102, includes an air station 160 that supplies compressed air to power a pneumatically-powered tool or to inflate one of the tires 151.

The left side 103 includes pump stations 170 that are each provided with a storage tank 171 for storage of a fuel or lubricating oil needed to refuel or change oil for a stranded vehicle. The pump stations 170 are further defined with a pump dispenser 172. The pump stations 170 are each equipped with a lock 173 to lock/unlock access to the pump dispenser 172.

It shall be noted that the left side 103 and the right side 104 may be interchanged as for the location of the tire change station 140, the tire balance station 130, the tire rack 150 versus the pump stations 170.

Figure 6:
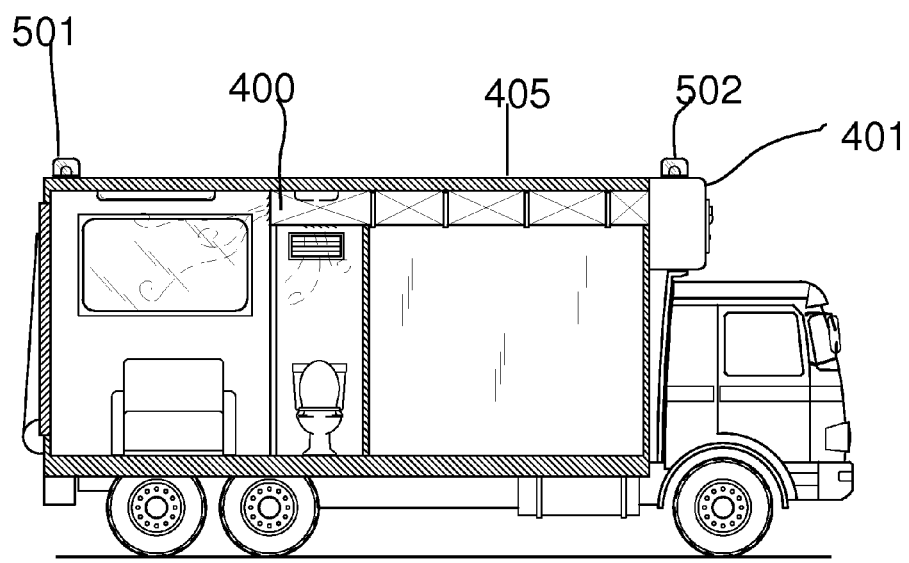
FIG. 6 illustrates a cross-sectional view along line 6-6 in FIG. 3, and depicting the interior of the customer lounge.

In referencing FIG. 6, the trailer 102 includes an interior 108 that is partially occupied with a customer lounge 180. The customer lounge 180 is outfitted with customer seating 181 (couch), a television 182, a bathroom 190 that includes a toilet 191, and a vending machine 183. The customer lounge 180 is included and integrated into the design of the trailer 102 in order to provide an area for a customer to stay during maintenance and/or repair of his/her vehicle.

The customer lounge 180 includes an AC ductwork 400 that spans from the customer lounge 180 to an AC unit 401 mounted on forward portion of the trailer 102. The AC ductwork 400 spans across a ceiling 405 of the trailer 102, and passes over the pump stations 170.

The top surface 500 of the trailer 102 includes a first flashing light member 501 and a second flashing light member 502. The first flashing light member 501 is located at a rear of the trailer 102 whereas the second flashing light member 502 is located at a front of the trailer 102. Both the first flashing light member 501 and the second flashing light member 502 are operated to alert passing motorists of the invention 100, and to increase awareness in the general vicinity.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mobile repair and response unit comprising:
a truck with a body specially designed to include a tire change station, a tire balance station, a tire rack;
wherein a customer lounge is integrated into the interior of the body;
wherein the body is further defined with a left side, a right side, and a rear side; wherein the body is further defined with a ramp that folds down to expose a rear entrance provided at the rear side of the trailer; wherein the rear entrance includes an overhead roll-up door that opens and closes the rear entrance;
wherein the right side, behind roll-up doors, includes the tire balance station that is adjacent the tire change station; wherein the tire change station is also adjacent the tire rack that supplies a plurality of different sized tires thereon; wherein an air station supplies compressed air to power a pneumatically-powered tool or to inflate one of the tires;
wherein the left side includes pump stations that are each provided with a storage tank for storage of a fuel or lubricating oil needed to refuel or change oil;
wherein the pump stations are further defined with a pump dispenser;
wherein the pump stations are further defined with a lock that locks or unlocks the respective pump dispenser.

2. The mobile repair and response unit as described in claim 1 wherein the customer lounge is outfitted with customer seating, a television, a bathroom that includes a toilet, and a vending machine.

3. The mobile repair and response unit as described in claim 2 wherein the customer lounge includes an AC ductwork that extends forwardly along a ceiling to an AC unit located at a front of the body, and which supplies air conditioned air into the customer lounge; wherein the AC ductwork passes over the pump stations.

4. The mobile repair and response unit as described in claim 3 wherein a top surface of the trailer includes a first flashing light member and a second flashing light member; wherein the first flashing light member is located at a rear of the body whereas the second flashing light member is located at a front of the body; wherein both the first flashing light member and the second flashing light member are operated to alert passing motorists of the mobile repair and response unit, and to increase awareness in the general vicinity.

5. A mobile repair and response unit comprising:
a truck with a body specially designed to include a tire change station, a tire balance station, a tire rack;
wherein a customer lounge is integrated into the interior of the body;
wherein the body is further defined with a left side, a right side, and a rear side; wherein the body is further defined with a ramp that folds down to expose a rear entrance provided at the rear side of the trailer; wherein the rear entrance includes an overhead roll-up door that opens and closes the rear entrance;
wherein the customer lounge is outfitted with customer seating, a television, a bathroom that includes a toilet, and a vending machine;
wherein the left side, behind roll-up doors, includes the tire balance station that is adjacent the tire change station; wherein the tire change station is also adjacent the tire rack that supplies a plurality of different sized tires thereon; wherein an air station supplies compressed air to power a pneumatically-powered tool or to inflate one of the tires;
wherein the right side includes pump stations that are each provided with a storage tank for storage of a fuel or lubricating oil needed to refuel or change oil;
wherein the pump stations are further defined with a pump dispenser;
wherein the pump stations are further defined with a lock that locks or unlocks the respective pump dispenser.

6. The mobile repair and response unit as described in claim 5 wherein the customer lounge includes an AC ductwork that extends forwardly along a ceiling to an AC unit located at a front of the trailer, and which supplies air conditioned air into the customer lounge; wherein the AC ductwork passes over the pump stations.

7. The mobile repair and response unit as described in claim 6 wherein a top surface of the trailer includes a first flashing light member and a second flashing light member; wherein the first flashing light member is located at a rear of the trailer whereas the second flashing light member is located at a front of the trailer; wherein both the first flashing light member and the second flashing light member are operated to alert passing motorists of the mobile repair and response unit, and to increase awareness in the general vicinity.

* * * * *